United States Patent [19]

Kasano

[11] Patent Number: 4,837,841
[45] Date of Patent: Jun. 6, 1989

[54] METHOD FOR REALIZING HIGH-SPEED STATISTIC OPERATION PROCESSING AND IMAGE DATA PROCESSING APPARATUS FOR EMBODYING THE METHOD

[75] Inventor: Akira Kasano, Tokyo, Japan

[73] Assignee: Kabushiki Kaisha Toshiba, Kawasaki, Japan

[21] Appl. No.: 61,285

[22] Filed: Jun. 12, 1987

[30] Foreign Application Priority Data

Jun. 16, 1986 [JP] Japan .................. 61-139815

[51] Int. Cl.$^4$ ............................................. G06K 9/46
[52] U.S. Cl. ........................................ 382/18; 382/51
[58] Field of Search .................... 382/18, 34, 39, 41, 382/42, 51; 364/728; 358/160, 166

[56] References Cited

U.S. PATENT DOCUMENTS 4,227,177 10/1980 Moshier .................. 382/39
4,535,473 8/1985 Sakata .................... 382/51

OTHER PUBLICATIONS

A. Kasano, "Image Processing Techniques Through the Application of High-Speed Image Processors", Image Information I, Aug. 1986, pp. 118-123.

Primary Examiner—Leo H. Boudreau
Assistant Examiner—Jose L. Couso
Attorney, Agent, or Firm—Foley & Lardner, Schwartz, Jeffery, Schwaab, Mack, Blumenthal & Evans

[57] ABSTRACT

According to this invention, in image data A and B which are respectively constituted by pixel groups $\Sigma A_{ij}$ and $\Sigma B_{ij}$ consisting of N pixels $A_{ij}$ and $B_{ij}$ (N is a positive integer; i and j respectively indicate a row position and a column position), and in which density data $A_{dij}$ and $B_{dij}$ of the pixels are expressed by n(2m)-bit data (n and m are positive integers), designated 2m-bit portion $a_{ij}$ of each density data $A_{dij}$ of image data A is divided into upper m-bit portion $a_{uij}$ and lower m-bit portion $a_{Lij}$. A histogram processor calculates $\Sigma a_{ij} \cdot b_{ij}$ between 2m-bit portions $a_{ij}$ and $b_{ij}$ using a histogram obtained by the upper or lower m-bit portion $a_{uij}$ or $a_{Lij}$ and designated 2m-bit portion $b_{ij}$ of each density data $B_{dij}$ of pixel group $\Sigma B_{ij}$. An average can also be calculated by a calculation section using the histogram. Therefore, a covariance can be calculated at high speed.

19 Claims, 5 Drawing Sheets

METHOD FOR REALIZING HIGH-SPEED STATISTIC OPERATION PROCESSING AND IMAGE DATA PROCESSING APPARATUS FOR EMBODYING THE METHOD

BACKGROUND OF THE INVENTION

The present invention relates to a method for realizing high-speed statistic operation processing such as covariance operation processing between two image data, and an image data processing apparatus for embodying the method.

Covariance $\sigma_{AB}$ between pixel groups $\Sigma A_{ij}$ and $\Sigma B_{ij}$ (where i and j respectively indicate a row position and a column position) respectively corresponding to two image data A and B in which density data $A_{dij}$ and $B_{dij}$ of pixels $A_{ij}$ and $B_{ij}$ can be expressed by 8-bit data, can be expressed by the following equation (1) if the number of pixels of image data A and B is given as N and density averages of image data A and B are respectively given as $\mu_A$ and $\mu_B$:

$$\begin{aligned}
\sigma_{AB} &= (1/N) \sum_{ij} (A_{dij} - \mu_A)(B_{dij} - \mu_B) \\
&= (1/N) \sum_{ij} (A_{dij} \cdot B_{dij} - \mu_B \cdot A_{dij} - \mu_A \cdot B_{dij} + \mu_A \mu_B) \\
&= (1/N) \left( \sum_{ij} A_{dij} \cdot B_{dij} - \mu_B \sum_{ij} A_{dij} - \mu_A \sum_{ij} B_{dij} \right) + \\
&\quad \mu_A \cdot \mu_B \sum_{ij} 1)
\end{aligned}$$

where since $(1/N) \sum_{ij} A_{dij} = \mu_A$, $(1/N) \sum_{ij} B_{dij} = \mu_B$, and $\sum_{ij} 1 = N$, then, $$\sigma_{AB} = (1/N) \sum_{ij} A_{dij} B_{dij} - \mu_A \mu_B \quad (1)$$

The first term in equation (1) can be obtained from the following equation:

$$\sum_{ij} A_{dij} \cdot B_{dij} = \sum_{K_B=0}^{255} \sum_{K_B=0}^{255} h(2^8 k_A + k_B) \cdot k_A \cdot k_B \quad (2)$$

where histogram $h(2^8 K_A + k_B)$ represents a histogram wherein the value of density data $A_{dij}$ of pixel $A_{ij}$ is $k_A$ ($k_A = 0$ to 255) and the value of density data $B_{dij}$ of pixel $B_{ij}$ at the same position as pixel $A_{ij}$ is $k_B$ ($k_B = 0$ to 255). This histogram can be obtained using a 16-bit histogram processor.

Since the histogram processor is used for various image data processing operations as is known, it is inevitable hardware for the image data processing apparatus. Therefore, a method for obtaining $$\sum_{ij} A_{dij} B_{dij}$$

using the histogram processor is advantageous in view of an effective operation of hardware of the image data processing apparatus. However, the 16-bit histogram processor used in this method has a complicated hardware arrangement, and requires $2^8 \times 2^8$, i.e., 64 K data entry in order to store a histogram operation result of 8-bit image data A and B. Therefore, an arithmetic operation volume is considerable, and a high-speed operation cannot be performed.

SUMMARY OF THE INVENTION

The present invention has been made in consideration of the above situation and has as its object to provide a method for carrying out a statistic operation between first and second image data at high speed. The first image data is constituted by pixel group $\Sigma A_{ij}$ consisting of N pixels $A_{ij}$ (N is a positive integer; i and j respectively indicate a row position and a column position), and density data $A_{dij}$ of each pixel $A_{ij}$ is expressed by n(2m)-bit data (n and m are positive integers). The second image data is constituted by pixel group $\Sigma B_{ij}$ consisting of N pixels $B_{ij}$ (N is a positive integer; i and j respectively indicate a row position and a column position), and density data $B_{dij}$ of each pixel $B_{ij}$ is expressed by n(2m)-bit data (n and m are positive integers).

The method is characterized by comprising:

carrying out, in accordance with an input $\Sigma AB$ processing command, a 3m-bit histogram operation for obtaining histogram $h_U(2^{2m}k_U + k_b)$ representing the number of sets of pixels $A_{ij}$ and $B_{ij}$, in which a value of upper m-bit portion $a_{Uij}$ of designated 2m-bit portion $a_{ij}$ is $k_U$ and a value of designated 2m-bit portion of pixel $B_{ij}$ at the same position as pixel $A_{ij}$ is $k_B$, from designated 2m-bit portion $a_{ij}$ of each density data $A_{dij}$ of input pixel group $\Sigma A_{ij}$ and designated 2m-bit portion $b_{ij}$ of each density data $B_{dij}$ of pixel group $\Sigma B_{ij}$, and calculating upper correlation weight $T_U$ from following equation (1) using resultant histogram $h_U(2^{2m}k_U + k_B)$.

$$T_U = \sum_{k_U=0}^{15} \sum_{k_B=0}^{255} h_U(2^{2m}k_U + k_B) \cdot k_U \cdot k_B \quad (1)$$

carrying out, in accordance with the input $\Sigma AB$ processing command, the 3m-bit histogram operation for obtaining $h_L(2^{2m}k_L + k_B)$ representing the number of sets of pixels $A_{ij}$ and $B_{ij}$, in which a value of lower m-bit portion $a_{Lij}$ of designated 2m-bit portion $a_{ij}$ is $k_L$ and a value of designated 2m-bit portion of pixel $B_{ij}$ at the same position as pixel $A_{ij}$ is $k_B$, from designated 2m-bit portion $a_{ij}$ of each density data $A_{dij}$ of input pixel group $\Sigma A_{ij}$ designated 2m-bit portion $b_{ij}$ of each density data $B_{dij}$ of pixel group $\Sigma B_{ij}$, and calculating lower correlation weight $T_L$ from following equation (2) using resultant histogram $h_L (2^{2m}k_L + k_B)$:

$$T_L = \sum_{k_L=0}^{15} \sum_{k_B=0}^{255} h_L(2^{2m}k_L + k_B) \cdot k_L \cdot k_B \quad (2)$$

and, calculating, in accordance with the input AB processing command, correlation weight $T_{ab}$ from resultant upper and lower correlation weights $T_U$ and $T_L$ using following equation (3):

$$T_{ab} = 2^m T_U + T_L \quad (3)$$

It is another object of the present invention to provide an image data processing apparatus for carrying out a statistic operation between first and second image data at high speed. The apparatus comprises:

a first image memory for storing first image data, wherein the first image data is constituted by pixel group $\Sigma A_{ij}$ consisting of N pixels $A_{ij}$ (N is a positive j integer; i and j respectively indicate a row position and a column position), and density data $A_{dij}$ of each pixel $A_{ij}$ is expressed by n(2m)-bit data (n and m are positive integers):

a second image memory for storing second image data, wherein the second image data is constituted by pixel group $\Sigma B_{ij}$ consisting of N pixels $B_{ij}$ (N is a positive integer; i and j respectively indicate a row position and a column position), and density data $B_{dij}$ of each pixel $B_{ij}$ is expressed by n(2m)-bit data (n and are positive integers);

histogram processor for carrying out, in accordance with a $\Sigma AB$ processing command input thereto, a 3m-bit histogram operation for obtaining $h_U(2^{2m}k+k_B)$ or $h_L(2^{2m}k+k_B)$ representing the number of sets of pixels $A_{ij}$ and $B_{ij}$, in which a value of upper or lower m-bit portion $a_{Uij}$ or $a_{Lij}$ of designated 2m-bit portion $a_{ij}$ is k and a value of designated 2m-bit portion of pixel $B_{ij}$ at the same position as pixel $A_{ij}$ is $k_B$, from upper or lower m-bit portion $a_{Uij}$ or $a_{Lij}$ of the designated 2m-bit portion $a_{ij}$ of each density data $A_{dij}$ read out from the first image memory and the designated 2m-bit portion $b_{ij}$ of each density data $B_{dij}$ read out from the second image memory;

calculation section for calculating, in accordance with the $\Sigma AB$ processing command input thereto, upper correlation weight $T_U$ from equation (1) using the histogram $h_U(2^{2m}k+k_B)$, and lower correlation weight $T_L$ from equation (2) using the histogram $h_L(2^{2m}k+k_B)$, and for calculating, in accordance with the input $\Sigma AB$ processing command, correlation weight $T_{ab}$ using equation (3) from the upper and lower correlation weights $T_U$ and $T_L$:

$$T_U = \sum_{k=0}^{15} \sum_{k_B=0}^{255} h_U(2^{2m}k + kB) \cdot k \cdot k_B \quad (1)$$

$$T_L = \sum_{k=0}^{15} \sum_{k_B=0}^{255} h_L(2^{2m}k + kB) \cdot k \cdot k_B \quad (2)$$

$$T_{ab} = 2^m T_U + T_L \quad (3)$$

and, controller for controlling the histogram processor and the calculation section.

As described above, according to the image data processing apparatus of the present invention, in 2m-bit density data $A_{dij}$ of each pixel $A_{ij}$ of pixel group $\Sigma A_{ij}$ constituting image data A and 2m-bit density data $B_{dij}$ of each pixel Bij of pixel group $\Sigma Bij$ constituting image data B, since a 3m-bit histogram processor can be used in order to obtain total sum $$\sum_{ij} A_{dij} \cdot B_{dji}$$

of a product of density data Adij and Bdij, the hardware arrangement of the apparatus can be simplified. As compared to a case wherein a 4m-bit histogram processor is used, the number of results of histogram operation can be decreased to $2\{2^{3m}/2^{4m}\} = \frac{1}{2}^{m-1}$. More specifically, a data volume necessary for calculating total sum $$\sum_{ij} A_{dij} \cdot B_{dij}$$

can be considerably decreased. Therefore, arithmetic operation processing can be performed at high speed. The apparatus of the present invention can be applied to a statistic operation (average, variance, and covariance) associated with image data exceeding 2m bits, and can contribute to the high-speed operation of this type.

DETAILED DESCRIPTION OF THE PREFERRED EMBODIMENTS

An embodiment of an image data processing apparatus according to the present invention will now be described with reference to the accompanying drawings.

Figure 1:
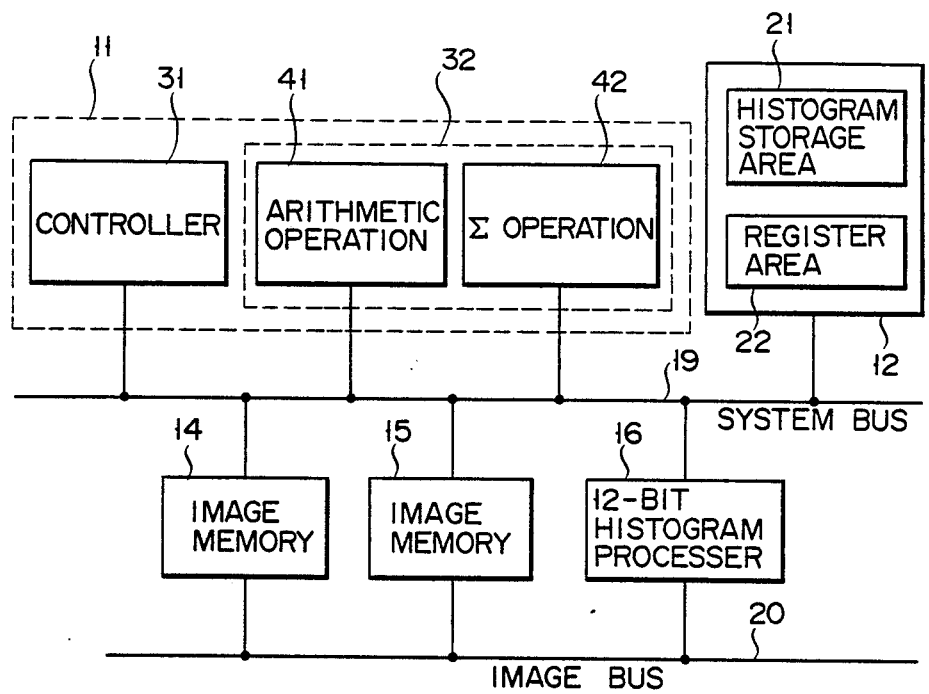
FIG. 1 is a block diagram showing an arrangement of an image data processing apparatus according to a first embodiment of the present invention.

FIG. 1 is a block diagram showing an arrangement of an image data processing apparatus according to a first embodiment of the present invention. Referring to FIG. 1, calculation control section 11 connected to system bus 19 controls the overall operation, and executes calculation processing. Image memories 14 and 15, and histogram processor 16 are connected to each other through image bus 20. They are also connected to control section 11 through system bus 19 as well as main memory 12. Image memories 14 and 15 respectively store image data A and B consisting of pixels $A_{ij}$ and $B_{ij}$ whose density data is expressed by n(2m) bits. A data length of histogram processor 16 corresponds to 3m bits. In the first embodiment, n=1 and m=4. Therefore, the data lengths of image memories 14 and 15 and processor 16 are respectively 8, 8, and 12 bits. The data length of image bus 20 is also 8 bits.

Figure 2:
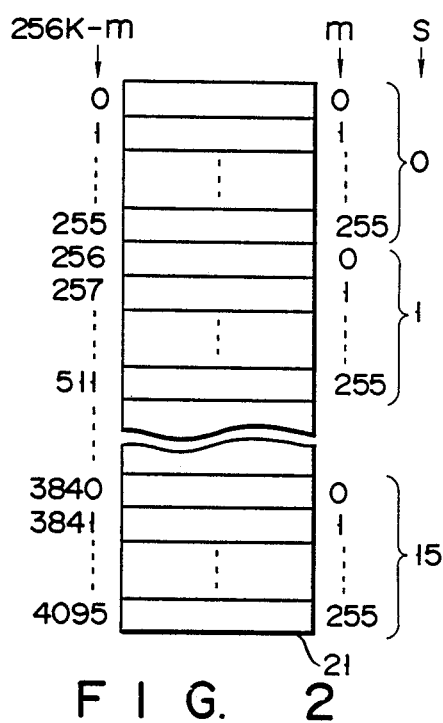
FIG. 2 is a memory map showing a histogram storage area in a main memory shown in FIG. 1.

Main memory 12 has histogram storage area 21 for storing the histogram operation results of processor 16 and register area 22 for holding the intermediate results of the operation. Storage area 21 consists of 16 blocks as shown in FIG. 2, and in each block, the number of entries is 256. The number of entries corresponds to the number of bits of density data.

Control section 11 comprises controller 31 and calculation section 32 for arithmetic operation unit 41 and Σ operation unit 42. Controller 31 generates various processing commands in accordance with an input statistic operation command. When an average operation command is input, controller 31 generates a 2m weight processing command including a 2m histogram processing command. When a covariance operation command is input, controller 31 generates a ΣAB processing command, an average processing command, and a σ arithmetic operation command. The ΣAB processing command consists of an upper correlation weight processing command including an upper histogram processing command, a lower correlation weight processing command including a lower histogram processing command, and an addition command. The average processing command causes controller 31 to generate the 2m weight processing command including the 2m histogram processing command, as in the average operation command.

Processor 16 reads out density data of each pixel from a designated image memory in accordance with the histogram operation command, i.e., the upper histogram processing command, the lower histogram processing command, or the 2m histogram processing command, and executes the histogram operation. The obtained histogram operation result is stored in histogram storage area 21 of main memory 12. Processor 16 reads out image data A or B from designated image memory 14 or 15 in accordance with the 2m histogram processing command, and executes an 8-bit histogram operation. Processor 16 also executes a histogram operation between an upper or lower 4-bit portion of image data A stored in image memory A and image data B stored in image memory 15 in accordance with the upper or lower histogram processing command.

Figure 3:
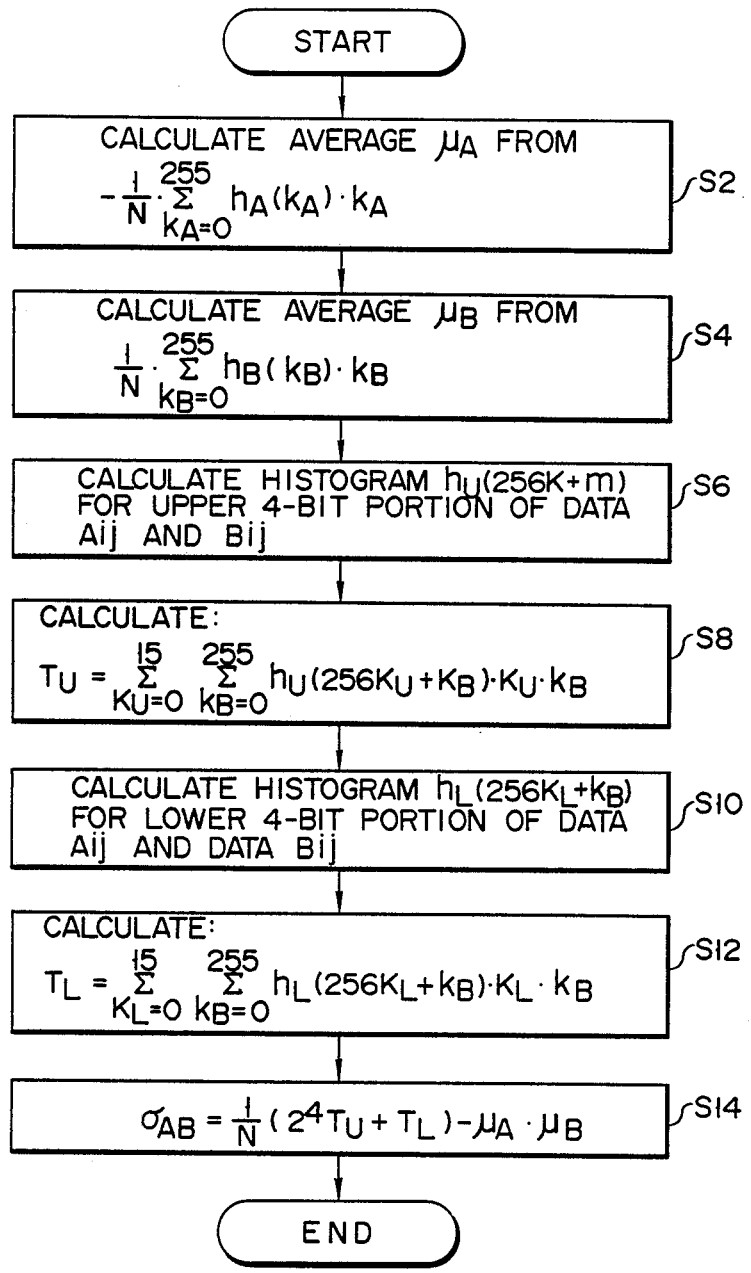
FIG. 3 is a flow chart for explaining the operation of the first embodiment.

Prior to the description of the first operation of the first embodiment with reference to the flow chart shown in FIG. 3, the basic principle of the present invention will be explained with reference to covariance operation processing between 8-bit image data A and B.

Assume that image data A and B are respectively stored in image memories 14 and 15. Image data A is constituted by pixel group $\Sigma A_{ij}$ (i and j respectively indicate a row position and a column position). Density data $A_{dij}$ of each pixel $A_{ij}$ is expressed by 8-bit data, and its value is $k_A$ ($k_A=0$ to 255). This also applies to image data B. Density data $A_{dij}$ of each pixel $A_{ij}$ is divided into upper and lower 4-bit portions. If an upper 4-bit portion is given as $a_{Uij}$ and a lower 4-bit portion is given as $a_{Lij}$, density data $A_{dij}$ of pixel $A_{ij}$ can be expressed by:

$$A_{dij} = 16 a_{Uij} + a_{Lij} \quad (3)$$

Therefore, covariance $\sigma_{AB}$ expressed by equation (1) can be rewritten as:

$$\sigma_{AB} = (1/N) \sum_{ij} A_{dij} B_{dij} - \mu_A \mu_B \quad (4)$$
$$= (1/N) \left( 2^4 \sum_{ij} a_{Uij} B_{dij} + \sum_{ij} a_{Lij} B_{dij} \right) - \mu_A \mu_B$$

When sets of pixels $A_{ij}$ and $B_{ij}$ are classified in accordance with a value of upper 4-bit portion $a_{Uij}$ of density data $A_{dij}$ of pixel $A_{ij}$ and a value of density data $B_{dij}$ of pixel $B_{ij}$ at the same position as pixel $A_{ij}$, histogram $h_U(2^8 k_U + k_B)$ presents the number of sets of pixels $A_{ij}$ and $B_{ij}$ in which the value of upper 4-bit portion $a_{Uij}$ is $k_U$ ($k_U=0$ to 15) and a value of density data $B_{dij}$ is $k_B$ ($k_B=0$ to 255). The total sums (to be referred to as upper and lower correlation weights hereinafter) in parentheses of equation (4) is anything but obtaining weight between density data of pixel groups $\Sigma A_{ij}$ and $\Sigma B_{ij}$. Therefore, if the upper and lower correlation weights are respectively given as $T_U$ and $T_L$, they can be expressed as follows by utilizing histograms $h_U(2^8 k_U + k_B)$ and $h_L(2^8 k_L + k_B)$:

$$T_U = \sum_{ij} a_{Uij} B_{dij} \quad (5)$$
$$= \sum_{kU=0}^{15} \sum_{kB=0}^{255} h_U(2^8 k_U + k_B) k_U \cdot k_B$$
$$T_L = \sum_{ij} a_{Lij} B_{dij}$$
$$= \sum_{kL=0}^{15} \sum_{kB=0}^{255} h_L(2^8 k_L + k_B) k_L \cdot k_B$$

If values of density data $A_{dij}$ and $B_{dij}$ are resepctively given as $k_A$ and $k_B$ ($k_A$, $k_B=0$ to 255), averages $\mu_A$ and $\mu_B$ can be expressed as follows by utilizing 8-bit histogram operation results $h_A(k_A)$ and $h_B(k_B)$:

$$\mu_A = (1/N) \sum_{ij} A_{dij} \quad (6)$$
$$= (1/N) \sum_{kA=0}^{255} h_A(k_A) \cdot k_A$$
$$\mu_B = (1/N) \sum_{ij} B_{dij}$$
$$= (1/N) \sum_{kB=0}^{255} h_B(k_B) \cdot k_B$$

Therefore, covariance $\sigma_{AB}$ can be expressed as follows on the basis of equations (1), (4), (5), and (6):

$$\sigma_{AB} = (1/N)(2^4 T_U + T_L) - \mu_A \mu_B \quad (7)$$

$(2^4 T_U + T_L)$ is called correlation weight $T_{AB}$.

The first operation of the first embodiment of the image data processing apparatus according to the present invention which can obtain a covariance at high speed by utilizing the above relations will be described with reference to FIG. 3.

Assume that a covariance operation command for calculating covariance $\sigma_{AB}$ between image data A and B is input. In step S2, an average processing command is generated. The 2m histogram processing command of the average processing command for image data A is output to histogram processor 16. The 2m histogram processing command is designated to use density data $A_{dij}$ of image data A and to set bit "0" for the remaining 4-bit portion. In response to this command, density data $A_{dij}$ for image data A is transferred from image memory 14 to processor 16 via image bus 20. Processor 16 classifies pixels of transferred image data A in accordance with density data $A_{dij}$, and determines histogram $h_A(k_A)$ ($k_A = 0$ to 255) indicating the number of pixels for each density. Resultant histogram $h_A(k_A)$ is stored in histogram storage areas 21 of main memory 12 via system bus 19.

Thereafter, in accordance with the 2m weight processing command generated according to the covariance operation command, $\Sigma$ operation unit 42 calcualtes average $\mu_A$ for image data A from equation (6) using transferred histogram $h_A(k_A)$. Calculated $\mu_A$ is stored in register area 22 of main memory 12.

After the execution of the average processing command for image data A, in step S4, the average processing command for image data B is output to processor 16 in the same manner as for image data A. In accordance with the 2m histogram processing command of the average processing command for image data B, image data B is transferred from image memory 15 to processor 16 in the same manner as image data A, and histogram $h_B(k_B)$ is calculated. Calculated histogram $h_B(k_B)$ is transferred to histogram storage area 21 of memory 12 via system bus 19. In accordance with the 2m weight processing command of the average processing command generated according to the covariance operation command, average $\mu_B$ is calculated from equation (6) by utilizing transferred histogram $h_B(k_B)$. Calculated average $\mu_B$ is stored in register area 22 as in average $\mu_A$.

In the above description, after average $\mu_A$ is calculated, image data B is transferred to processor 16. If the 2m histogram processing command for image data B is generated while average $\mu_A$ is calculated, covariance $\sigma_{AB}$ can be calculated at a higher speed.

When averages $\mu_A$ and $\mu_B$ are calculated, in step S6, the upper correlation weight processing command is output to 12-bit histogram processor 16 in order to calculate a weight for upper 4-bit portion $a_{Uij}$ of density data $A_{dij}$ of pixel $A_{ij}$ and density data $B_{dij}$ of pixel $B_{ij}$. In order to calculate its histogram $h_U(2^8 k_U + k_B)$, the upper histogram processing command of the upper correlation weight processing command is instructed via system bus 19. In response to this command, density data $A_{dij}$ of image data A and density data $B_{dij}$ of image data B are fetched by processor 16 from image memories 14 and 15. Processor 16 executes a histogram operation for obtaining histogram $h_U(2^8 k_U + k_B)$ from transferred upper 4-bit portion $a_{Uij}$ of image data A and image data B. Resultant histogram $h_U(2^8 k_U + k_B)$ is stored in storage area 21 of memory 12. An mth entry of an sth block of storage area 21 stores the number of pixels whose density is $k_B$ of pixels $B_{ij}$ at the same position as pixels $A_{ij}$ which have value $k_U$ of upper 4 bits of density data $A_{dij}$.

When histogram $h_U(2^8 k_U + k_B)$ for upper 4 bits of density data $A_{dij}$ of pixel $A_{ij}$ is obtained, in step S8, $\Sigma$ operation unit 42 calculates upper correlation weight $T_U$ from equation (5) by utilizing stored histogram $h_U(2^8 k_U + k_B)$ in accordance with the upper correlation weight processing command. Obtained value $T_U$ is stored in register area 22.

Thereafter, in step S10, the lower histogram processing command of the lower correlation weight processing command generated according to the covariance operation command is generated in the same manner as upper 4-bit portion $a_{Uij}$ so as to calculate histogram $h_L(2^8 k_L + k_B)$ of lower 4-bit portion $a_{Lij}$ of density data $A_{dij}$ of image data A and image data B. Thus, density data $A_{dij}$ of pixels $A_{ij}$ of pixel group $\Sigma A_{ij}$ and density data $B_{dij}$ of pixels $B_{ij}$ of pixel group $\Sigma B_{ij}$ stored in image memory 15 are sequentially transferred to processor 16 via image bus 20, and histogram $h_L(2^8 k_L + k_B)$ is calculated. Calculated histogram $h_L(2^8 k_L + k_B)$ is stored in storage area 21 of memory 12. Thereafter, in step S12, lower correlation weight $T_L$ is calculated from equation (5) in accordance with the lower correlation weight processing command. Calculated value $T_L$ is stored in register area 22.

In the above description, after value $T_U$ for upper 4-bit portion $a_{Uij}$ of pixel $A_{ij}$ is obtained, image data A and B are transferred to processor 16 so as to obtain a histogram for lower 4-bit portion $a_{Lij}$. If the histogram processing command is generated while value $T_U$ is being calculated, covariance $\sigma_{AB}$ can be calculated at a higher speed. At this time, even if the histogram operation is completed, if the operation for obtaining value $T_U$ is not completed, the histogram operation result can be stored in histogram storage area 21 after completion of the operation of value $T_\mu$.

In step S14, arithmetic operation unit 41 calculates covariance $\sigma_{AB}$ by utilizing equation (7) using data $\mu_A$, $\mu_B$, $T_U$, and $T_L$ stored in register area 22 in accordance with the $\sigma$ arithmetic processing command generated according to the covariance operation command. In this case, a command for executing an operation of $2^4 TU + TL$ is referred to as an addition processing command. The upper correlation weight processing command including the upper histogram processing command, the lower correlation weight processing command including the lower histogram processing command, and the addition processing command are referred to as the $\Sigma AB$ processing command as a whole.

Covariance $\sigma_{AB}$ of 8-bit image data A and B can be obtained using the 2-bit processor, as described above.

In the description of the first embodiment, averages $\mu_A$ and $\mu_B$ for image data A and B are calculated in accordance with the 2 m weight processing command. However, averages $\mu_A$ and $\mu_B$ can be calculated by utilizing the histogram operation results of 12-bit histogram processor 16. A second embodiment for realizing it will be described below.

The second embodiment has the same arrangement as in that of the first embodiment except for the following point. In the second embodiment, an average processing command includes an upper weight processing command, and a lower weight processing command.

The operation of the second embodiment of the image data processing apparatus which can calculate averages of 8-bit image data A and B, and hence, a convariance, from the histogram operation results of 12-bit histogram processor 16 will be described below.

As can be seen from equation (6), average $\mu_A$ of image data $A_{ij}$ can be calculated by dividing the total sum of density data of pixels $A_{ij}$ by total number N of pixels. Therefore, by utilizing the histogram, the weights of pixels are multiplied, and the product is divided by pixel number N, thereby calculating average $\mu$. More specifically, if density data $A_{dij}$ of image data A is expressed by equation (3), average $\mu_A$ can be:

$$\mu_A = (1/N) \sum_{ij} A_{dij}$$

$$= (1/N) \sum_{ij} (2^4 a_{Uij} + a_{Lij})$$

$$= 2^4 \cdot (1/N) \sum_{kU=0}^{15} \sum_{kB=0}^{255} h_U(2^8 k_U + k_B) k_U +$$

$$(1/N) \sum_{kL=0}^{15} \sum_{kB=0}^{255} h_L(2^8 k_L + k_B) k_L$$

Similarly, average $\mu_B$ can be:

$$U_B = (1/N) \sum_{kB=0}^{255} \sum_{kU=0}^{15} h_U(2^8 k_U + k_B) k_B + \qquad (9)$$

$$(1/N) \sum_{kB=0}^{255} \sum_{kL=0}^{15} h_L(2^8 k_L + k_B) k_B$$

More specifically, in the case of average $\mu_B$, the number of pixels for certain density $k_B$ is obtained, and average $\mu_B$ is calculated based on the number of pixels. Therefore, the order of the total sum is reversed as compared with a case of equation (8). If an upper A weight, an upper B weight, a lower A weight, and a lower B weight are respectively given as $U_{UA}$, $U_{UB}$, $U_{LA}$, and $U_{LB}$, they can be expressed by:

$$U_{UA} = \sum_{kU=0}^{15} \sum_{kB=0}^{255} h_U(2^8 k_U + k_B) k_U$$

$$U_{UB} = \sum_{kB=0}^{255} \sum_{kU=0}^{15} h_U(2^8 k_U + k_B) k_B$$

$$U_{LA} = \sum_{kL=0}^{15} \sum_{kB=0}^{255} h_L(2^8 k_L + k_B) k_L$$

$$U_{LB} = \sum_{kB=0}^{255} \sum_{kL=0}^{15} h_L(2^8 k_L + k_B) k_B \qquad (10)$$

Therefore, equation (7) can be rewritten as:

$$\sigma_{AB} = (1/N)(2^4 T_U + T_L) - \mu_A \cdot \mu_B \qquad (11)$$

$$= (1/N)(2^4 T_U + T_L) -$$

$$(1/N^2)(2^4 U_{UA} = U_{LA})(U_{UB} + U_{LB})$$

Figure 4:
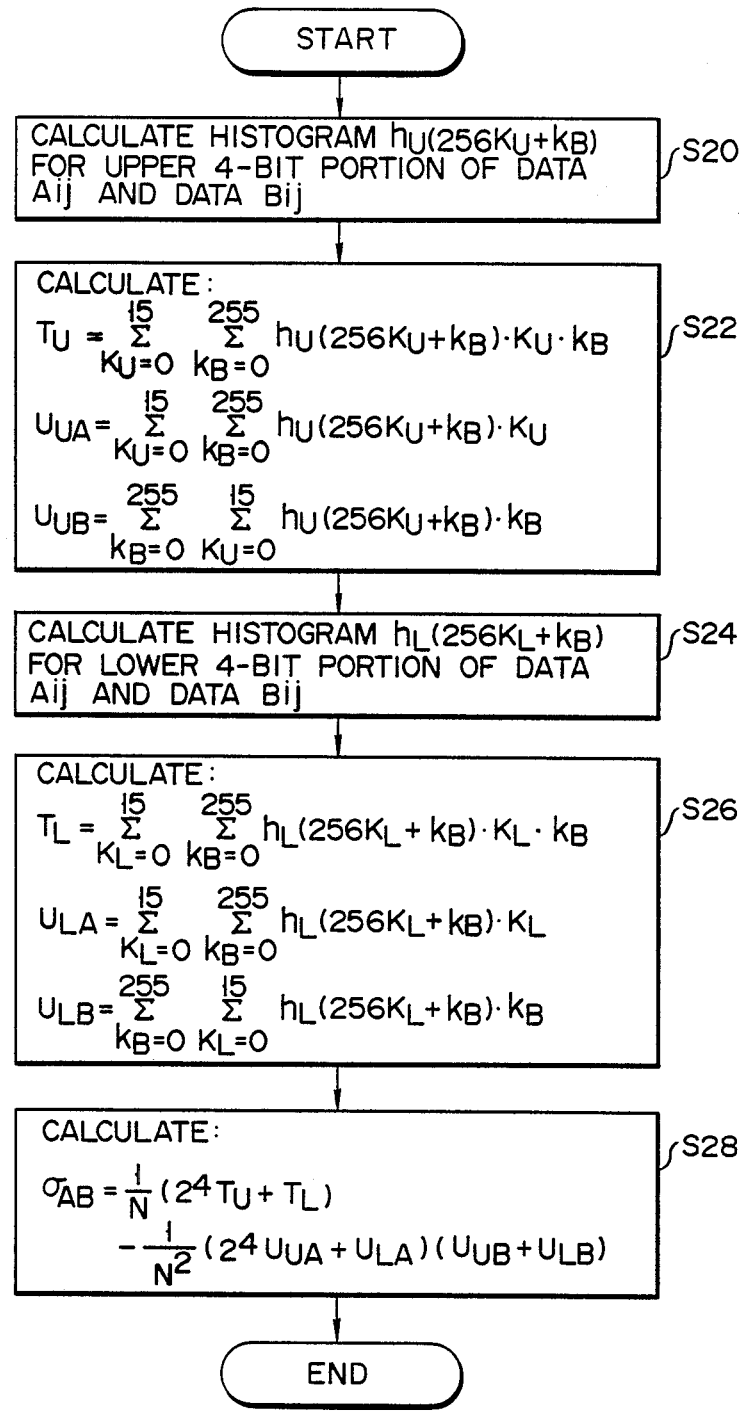
FIG. 4 is a flow chart for explaining the operation of a second embodiment.
Figure 5:
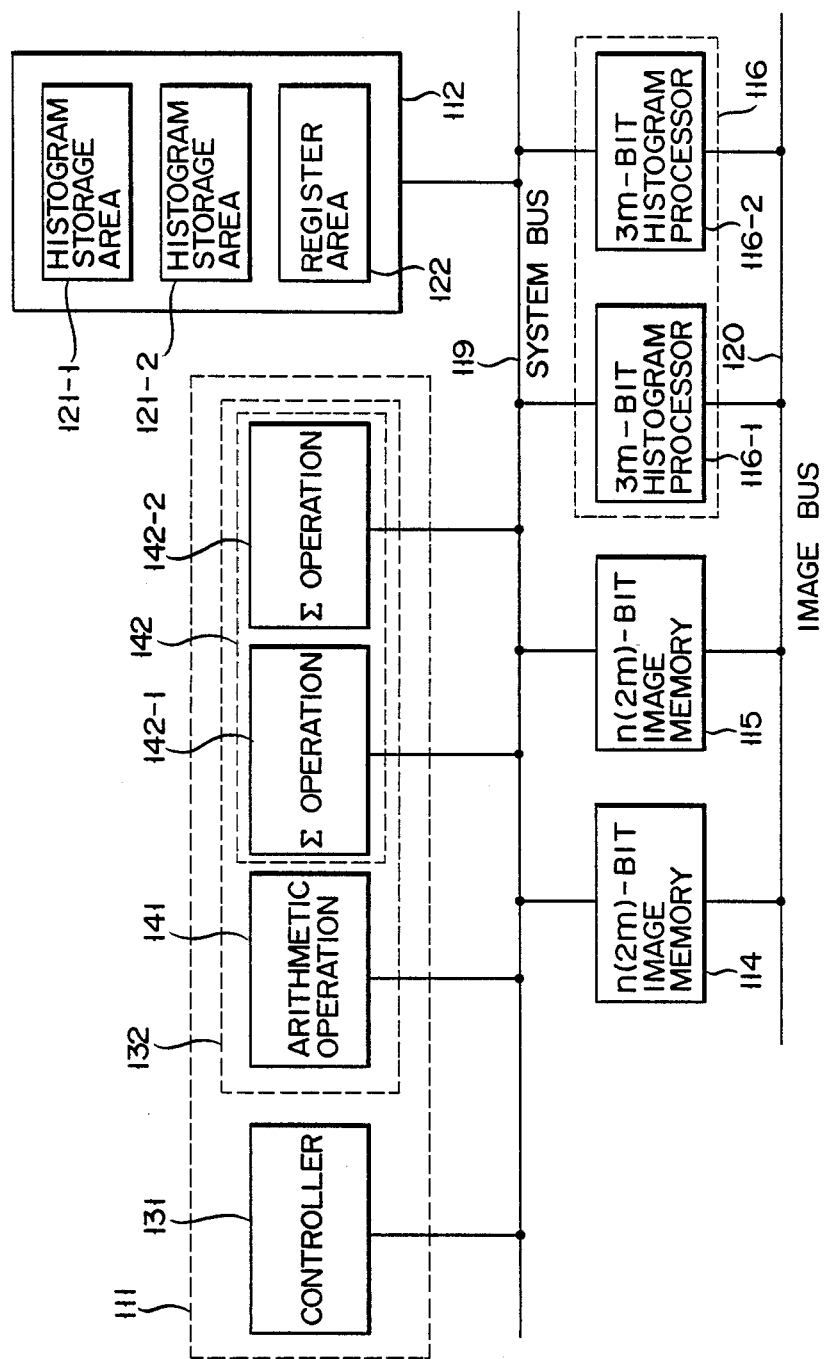
FIG. 5 is a block diagram showing an arrangement of a third embodiment.

The operation of the second embodiment will now be described with reference to FIG. 4.

In step S20, the upper correlation weight processing command is generated in accordance with the input covariance operation command in the same manner as in the first embodiment. Histogram processor 16 reads out upper 4-bit portion $a_{Uij}$ of image data A stored in image memory 14 and density data $B_{dij}$ of inage data B stored in image memory 15 in accordance with an upper histogram processing command of the upper correlation weight processing command, and executes a histogram operation. Calculated histogram $h_U(2^8 k_U + k_B)$ is stored in histogram storage area 21 of main memory 12. Thereafter, in step S22, $\Sigma$ operation unit 42 calculates upper correlation weight $T_U$ in accordance with the generated upper correlation weight processing command, and calculates upper A weight $U_{UA}$ and upper B weight $U_{UB}$ in accordance with the generated upper weight processing command.

In step S24, a lower correlation weight processing command is output to processor 16 in the same manner as for upper 4-bit portion $a_{Uij}$. Processor 16 calculates histogram $h_L(2^8 k_L + k_B)$ for $a_{Lij}$ and $B_{dij}$ in accordance with the lower histogram processing command of the lower correlation weight processing command. Resultant histogram $h_L(2^8 k_L + k_B)$ is stored in area 21. In step S26, by utilizing the stored histogram, lower correlation weight $T_L$ is calculated in accordance with the generated lower correlation weight processing command, and lower A weight $U_{LA}$ and lower B weight $U_{LB}$ is calculated in accordance with the lower weight processing command of the generated average processing command. Calculated values $T_L$, $U_{LA}$, and $U_{LB}$ are stored in register area 22.

In step S28, arithmetic operation unit 41 calculates covariance $\sigma_{AB}$ based on equation (11) from values $T_U$, $U_{UA}$, and $U_{UB}$ obtained in step S22 and values $T_L$, $U_{LA}$, and $U_{LB}$ obtained in step S26, in accordance with the $\sigma$ arithmetic operation command generated according to the covariance operation command.

In this manner, the covariance can be calculated faster than the operation of the first embodiment. In the above description, the covariance is calculated. When variance $\sigma_A 2$ is to be obtained, density data for pixels $A_{ij}$ can be read out twice from image memory 14 or 15. Resultant $\sigma_{AB}$ is made as $\sigma_A 2$.

A third embodiment of an image data processing apparatus according to the present invention which can execute a statistic operation associated with image data A and B whose density data is expressed by 16 bits or more, e.g., an operation for calculating an average, variance, and a covariance, will be described hereinafter.

In the third embodiment, calculation control section 111 controls the overall operation, and executes calculation processing. n(2m)-bit image memories 114 and 115, histogram processor section 116 including 3m-bit histogram processors 116-1 and 116-2, and main memory 112 are connected to section 111 via system bus 119. Image memories 114 and 115 and histogram processors 116-1 and 116-2 are connected to each other through image bus 120 having a 16-bit data length. Memory 112 has histogram storage areas 121-1 and 121-2 for respectively storing histogram operation results from processors 116-1 and 116-2. Memory 112 has register area 122 for storing data necessary for controlling intermediate operation results, and the like.

Section 111 comprises controller 131 for generating various processing commands in accordance with an input statistic operation command, and calculation unit 132 for executing calculation processing. Calculation unit 132 comprises arithmetic operation unit 141 and $\Sigma$ operation section 142 including $\Sigma$ operation units 142-1 and 142-2. When controller 131 receives an average operation command, it generates a total 2m-bit average processing command including a 2m histogram processing command and a total $\mu$ arithmetic operation command. When controller 131 receives a covariance operation command, it generates a total $\Sigma AB$ processing command, a total 2m-bit weight processing command, and a total $\sigma$ arithmetic operation command.

Prior to the description of the operation of the third embodiment, 16- and 24-bit average, covariance and variance operations will be described below.

Assume that n(2m)-bit image data A and B (in this embodiment 2m=8) are respectively stored in image memories 114 and 115. Density data $A_{dij}$ and $B_{dij}$ of pixels $A_{ij}$ and $B_{ij}$ of image data A and B whose density is expressed by n(2m) bits are classified in units of 8 bits. If lower pth 8-bit portions of the density data are respectively given as $a_{pij}$ and $b_{pij}$, density data $A_{dij}$ and $B_{dij}$ can be expressed by:

$$A_{dij} = \sum_{p=1}^{n} 2^8 a_{pij}, \quad B_{dij} = \sum_{p=1}^{n} 2^8 b_{pij} \tag{12}$$

Therefore, if image data A and B are 16-bit data, i.e., if n=2, average $\mu_A$ can be expressed by:

$$\begin{aligned}
\mu_A &= (1/N) \sum_{ij} (2^8 a_{2ij} + a_{1ij}) \\
&= (1/N) 2^8 \sum_{ij} a_{2ij} + (1/N) \sum_{ij} a_{1ij} \\
&= 2^8 \mu_{2A} + \mu_{1A}.
\end{aligned} \tag{13}$$

Average $\mu_B$ can be expressed as follows in the same manner as in average $\mu_A$:

$$\mu_B = 2^8 \mu_{2B} + \mu_{1B} \tag{14}$$

where $\mu_{2A}$, $\mu_{1A}$, and $\mu_{1B}$ are average values obtained from equation (6).

Covariance $\sigma_{AB}$ of image data A and B is:

$$\begin{aligned}
\sigma_{AB} &= (1/N) \sum_{ij} A_{di} \cdot B_{dij} - \mu_A \mu_B \\
&= (1/N) \sum_{ij} (2^8 a_{2ij} + a_{1ij})(2^8 b_{2ij} + b_{1ij}) - \mu_A \cdot \mu_B \\
&= (1/N)2^{16} \sum_{ij} a_{2ij} \cdot b_{2ij} + (1/N)2^8 \sum_{ij} a_{2ij} \cdot b_{1ij} + \\
&\quad (1/N)2^8 \sum_{ij} a_{1ij} \cdot b_{2ij} + (1/N) \sum_{ij} a_{1ij} \cdot b_{1ij} - \mu_A \cdot \mu_B
\end{aligned} \tag{15}$$

If upper and lower correlation weights between a pth 8-bit portion of image data A and a qth 8-bit portion of image data B obtained from equation (5) are respectively given as $T_{Upq}$ and $T_{Lpq}$ and if an upper A weight, an upper B weight, a lower A weight, and a lower B weight for image data A and B obtained from equation (10) when p=q are respectively given as $U_{UAp}$, $U_{UBp}$, $U_{LAp}$, and $U_{LBp}$, equation (15) can be rewritten as:

$$\begin{aligned}
\sigma_{AB} &= (1/N) \{2^{16} (2^4 T_{U22} + T_{L22}) + 2^8 (2^4 T_{U21} + T_{L21}) + \\
&\quad 2^8 (2^4 T_{U12} + T_{L12}) + (2^4 T_{U11} + T_{L11})\} - \\
&\quad (1/N^2) \{2^8 (2^4 U_{UA2} + U_{LA2}) + (2^4 U_{UA1} + U_{LA1})\} \times \\
&\quad \{\Sigma 2^8 (U_{UB2} + U_{LB2}) + (U_{UB1} + U_{LB1})\}
\end{aligned} \tag{16}$$

Variance $\sigma_A^2$ of image data A can be expressed by:

$$\begin{aligned}
\sigma_A^2 &= (1/N) \sum_{ij} (2^8 a_{2ij} + a_{1ij})^2 - \mu_A^2 \\
&= (1/N)2^{16} \sum_{ij} a_{2ij}^2 + (1/N)2^9 \sum_{ij} a_{2ij} a_{1ij} + (1/N) \sum_{ij} a_{1ij}^2 - \mu_A^2 \\
&= (1/N)\{2^{16}(2^4 T_{U22} + T_{L22}) + 2^9(2^4 T_{U21} + T_{L21}) + (2^4 T_{U11} + T_{L11})\} - (1/N^2)\{2^8(2^4 U_{UA2} + U_{LA2}) + (2^4 U_{UA1} + U_{LA1})\}^2
\end{aligned} \tag{17}$$

This also applies to image data B.

The above method applies to image data of 16 bits or more, e.g., 24-bit data, that is, image data A of n=3. Pixels $A_{ij}$ and $B_{ij}$ of 24-bit image data A and B can be expressed by:

$$A_{dij} = 2^{16} a_{3ij} + 2^8 a_{2ij} + a_{1ij} \tag{18}$$
$$B_{dij} = 2^{16} b_{3ij} + 2^8 b_{2ij} + b_{1ij}$$

Therefore, if image data A and B are 24-bit data, average $\mu_A$ can be expressed by:

$$\begin{aligned}
U_A &= (1/N) \sum_{ij} (2^{16} a_{3ij} + 2^8 a_{2ij} + a_{1ij}) \\
&= (1/N) 2^{16} \sum_{ij} a_{3ij} + (1/N) 2^8 \sum_{ij} a_{2ij} + (1/N) \sum_{ij} a_{1ij} \\
&= 2^{16} \mu_{3A} + 2^8 \mu_{2A} + \mu_{1A}
\end{aligned} \tag{19}$$

Average $\mu_B$ can be expressed as follows in the same manner as average $\mu_A$:

$$\mu_B = 2^{16} \mu_{3B} + 2^8 \mu_{2B} + \mu_{1B} \tag{20}$$

where $\mu_{3A}$, $\mu_{2A}$, $\mu_{1A}$, $\mu_{3B}$, $\mu_{2B}$, and $\mu_{1B}$ are averages obtained from equation (6).

Covariance $\sigma_{AB}$ of image data A and B can be given as:

$$\begin{aligned}
\sigma_{AB} &= (1/N) \sum_{ij} A_{dij} B_{dij} - \mu_A \mu_B \\
&= (1/N) \sum_{ij} (2^{16} a_{3ij} + 2^8 a_{2ij} + a_{1ij})(2^{16} b_{3ij} + 2^8 b_{2ij} + b_{1ij}) - \mu_A \cdot \mu_B \\
&= (1/N) 2^{32} \sum_{ij} a_{3ij} \cdot b_{3ij} + (1/N) 2^{24} \sum_{ij} a_{3ij} \cdot b_{2ij} + \\
&\quad (1/N) 2^{16} \sum_{ij} a_{3ij} \cdot b_{1ij} + (1/N) 2^{24} \sum_{ij} a_{2ij} \cdot b_{3ij} + \\
&\quad (1/N) 2^{16} \sum_{ij} a_{2ij} \cdot b_{2ij} + (1/N) 2^8 \sum_{ij} a_{2ij} \cdot b_{1ij} + \\
&\quad (1/N) 2^{16} \sum_{ij} a_{1ij} \cdot b_{3ij} + (1/N) 2^8 \sum_{ij} a_{1ij} \cdot b_{2ij} + 
\end{aligned}$$

-continued $$(1/N) \sum_{ij} a_{1ij} \cdot b_{1ij} - \mu_A \cdot \mu_B$$

If upper and lower correlation weights between a pth 8-bit portion of image data A and qth 8-bit portion of image data B obtained from equation (5) are respectively given as $T_{Upq}$ and $T_{Lpq}$ and if an upper A weight, an upper B weight, a lower A weight, and a lower B weight for image data A and B obtained from equation (10) when p=q are respectively given as $U_{UAp}$, $U_{UBp}$, $U_{LAp}$, and $U_{LBp}$, equation (15) can be rewritten as:

$$\sigma_{AB} = (1/N)\{2^{32}(2^4 T_{U33} + T_{L33}) + 2^{24}(2^4 T_{U32} + T_{L32}) + 2^{16}(2^4 T_{U31} + T_{L31}) + 2^{24}(2^4 T_{U23} + T_{L23}) + 2^{16}(2^4 T_{U22} + T_{L22}) + 2^8(2^4 T_{U21} + T_{L21}) + 2^{16}(2^4 T_{U13} + T_{L13}) + 2^8(2^4 T_{U12} + T_{L12}) + (2^4 T_{U11} + T_{L11})\} - (1/N^2)(2^{16}(2^4 U_{UA3} + U_{LA3}) + 2^8(2^4 U_{UA2} + U_{LA2}) + (2^4 U_{UA1} + U_{LA1})\} \cdot \{2^{16}(U_{UB3} + U_{LB3}) + 2^8(U_{UB2} + U_{LB2}) + (U_{UB1} + U_{LB1})\}$$

Variance $\sigma_A^2$ of image data A can be expressed by:

$$\sigma_A^2 = (1/N) \sum_{ij} (2^{16}a_{3ij} + 2^8 a_{2ij} + a_{1ij})^2 - \mu_A^2 \quad (22)$$

$$= (1/N)2^{32} \sum_{ij} a_{3ij}^2 + (1/N)2^{16} \sum_{ij} a_{2ij}^2 + (1/N) \sum_{ij} a_{1ij}^2 +$$

$$(1/N)2^{25} \sum_{ij} a_{3ij} \cdot a_{2ij} + (1/N)2^{17} \sum_{ij} a_{3ij} \cdot a_{1ij} + (1/N)2^9 \sum_{ij} a_{2ij} \cdot a_{1ij} - \mu_A^2$$

$$= (1/N)\{2^{32}(2^4 T_{U33} + T_{L33} + 2^{16}(2^4 T_{U22} + T_{L22}) + (2^4 T_{U11} + T_{L11}) + 2^{25}(2^4 T_{U32} + T_{L32}) + 2^{17}(2^4 T_{U31} + T_{L31}) + 2^9(2^4 T_{U21} + T_{L21})\} - (1/N^2)\{2^{16}(2^4 U_{UA3} + U_{LA3}) + 2^8(2^4 U_{UA2} + U_{LA2}) + (2^4 U_{UA1} + U_{LA1});56^2$$

Figure 6:
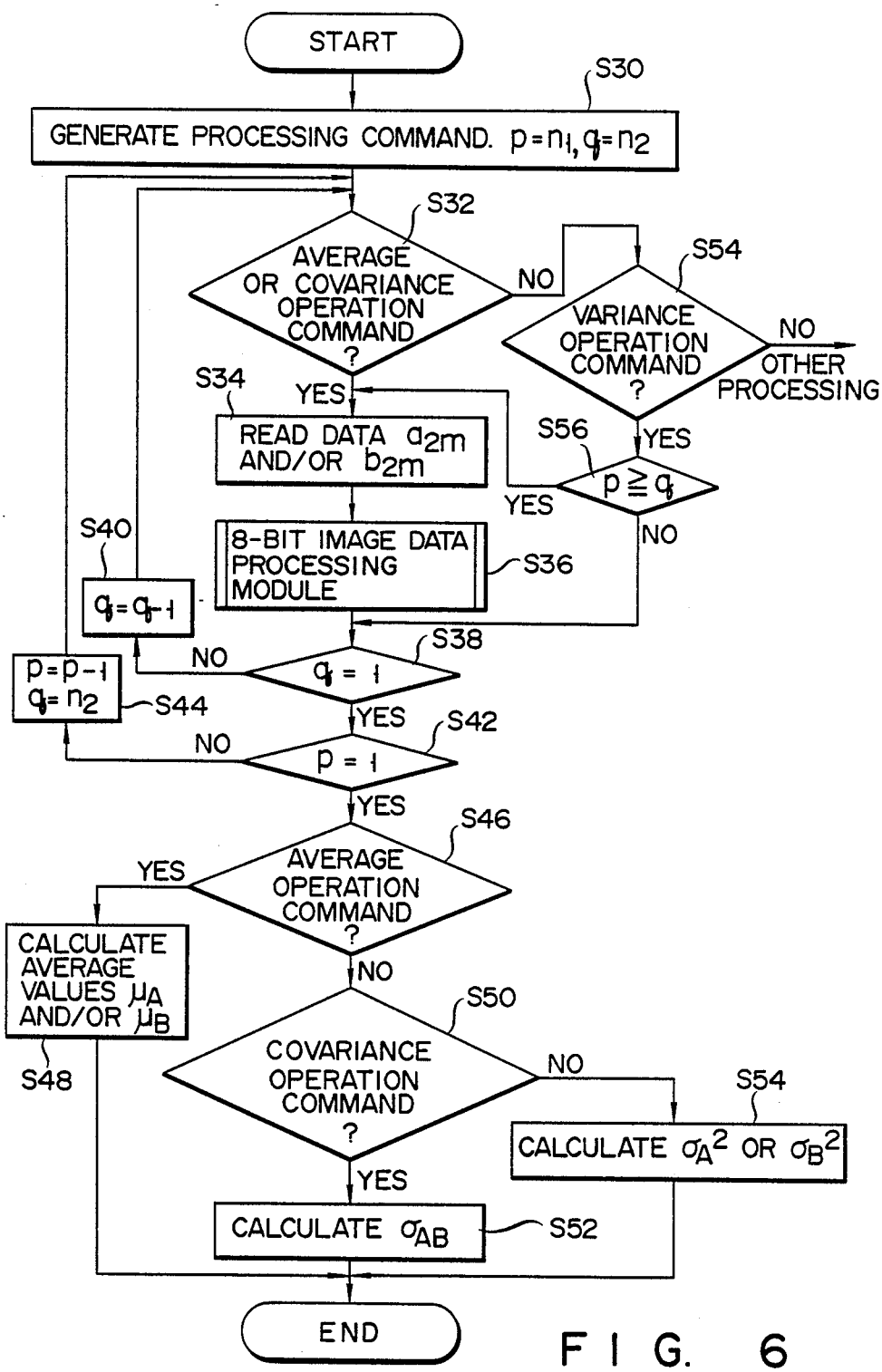
FIG. 6 is a flow chart for explaining the operation of the third embodiment.

The operation of the third embodiment will now be described with reference to FIG. 6. Assume that density data of image data stored in image memories 114 and 115 are expressed by 24-bit data.

A case will first be described wherein the average operation command for image data A is input as the statistic operation command. When the average operation command for image data A is input, a total 2m-bit average processing command is generated in step S30. The total 2m-bit average processing command includes the 2m-bit average processing command including the 2m histogram processing command for each of the 2m-bit portion $a_{pij}$. The 2m-bit average processing command is output to histogram processor 116-1.

Variable p is set to be $n_1(=1$ in this example), and variable q is set to be $n_2(=3$ in this example). It is checked in step S32 if an input command is an average or covariance operation command. If N in step S32, step S54 is executed. If Y in step S32, step S34 is executed. In this case, since the input command is the average operation command, step S34 is executed. In step S34, 8-bit portion $a_{3ij}$ designated by variables p and q is read out by processor 116-1. Readout 8-bit portion $a_{3ij}$ is subjected to processing in step S36. This step executes various processing operations of 8-bit image data in the first or second embodiment, and is called an 8-bit image data processing module.

Processor 116-1 executes a histogram operation associated with 8-bit data $a_{qij}$ whose remaining 4 bits are fetched as bit "0" in accordance with the 2m histogram processing command of the 2m-bit average processing command. If a value of 8-bit data $a_{qij}$ is given as k, histogram operation result $h_q(k)$ (k=0 to 255) is stored in histogram storage area 121-1 of main memory 112. Unit 142-1 calculates $\mu_{3A}$ for 8-bit portion $a_{3ij}$ from resultant histogram $h_3(k)$ using equation (6). $\mu_{3A}$ is stored in register area 122.

Subsequently, it is checked in step S38 if q=1. If Y in step S38, step S42 is executed. If N in step S38, step S40 is executed. In this case, since q=3, step S40 is executed. In step S40, value q is decremented by 1. Thereafter, step S32 is again executed. In this manner, $\mu_{2A}$ for 8-bit portion $a_{2ij}$ and $\mu_{1A}$ for 8-bit portion $a_{1ij}$ are calculated in the same manner as for 8-bit portion $a_{3ij}$. $\mu_{2A}$ and $\mu_{1A}$ are stored in register area 122.

When $\mu_{1A}$ is calculated, q=1, and Y is determined in step S38. It is checked in step S42 if p=1. If N in step S42, step S44 is executed. If Y in step S42, step S46 is executed. In this case, since p is left to be 1, Y is determined in step S42, and the flow advances to step S46. It is checked in step S46 if the input command is the average operation command. If N in step S46, step S50 is executed; otherwise, step S48 is executed. In this case, since Y is obtained in step S46, step S48 is executed, and average $\mu_A$ for image data A is calculated by arithmetic operation unit 141 using equation (19) in accordance with the $\mu$ arithmetic processing command.

A case will be described wherein the covariance operation command is input as the statistic operation command. When the covariance operation command is input, the total $\Sigma AB$ processing command, the total 2m-bit weight processing command, and the total $\sigma$ arithmetic processing command are generated in step S30. The upper histogram processing command included in the upper correlation weight processing command of the $\Sigma AB$ processing command for 2m-bit portions $a_{pij}$ and $b_{qij}$ of the total $\Sigma AB$ processing command and the lower histogram processing command included in the lower correlation weight processing command thereof are respectively output to histogram processors 116-1 and 116-2. $n_1$ and $n_2$ are set to be 3. More specifically, initial values of variables p and q are 3. Since the covariance operation command has already been input, Y is determined in step S32. 8-bit portions $a_{3ij}$ and $b_{3ij}$ designated by variables p and q are read out, and are supplied to histogram processors 116-1 and 116-2, respectively.

In step S36, histogram $h_U(2^8 k_U + k_B)$ is calculated from an upper 4-bit portion of data $a_{3ij}$ and data $b_{3ij}$ by processor 116-1, and histogram $h_L(2^8 k_L + k_B)$ is calculated from a lower 4-bit portion of data $a_{3ij}$ and data $b_{3ij}$ by processor 116-2, and they are stored in storage areas 121-1 and 121-2, respectively. Units 142-1 and 142-2 respectively calculated upper and lower correlation weights $T_{U33}$ and $T_{L33}$ based on equation (5) using the histograms stored in storage areas 121-1 and 121-2, in accordance with the upper or lower correlation weight processing command. Calculated upper and lower correlation weights $T_{U33}$ and $T_{L33}$ are stored in register area 122. Since p=q, units 142-1 and 142-2 calculate upper A weight $U_{UA3}$, upper B weight $U_{UB3}$, lower A weight $U_{LA3}$, and lower B weight $U_{LB3}$ according to equation (10) using the histogram stored in storage areas 121-1 and 121-2. Calculated $U_{UA3}$, $U_{UB3}$, $U_{LA3}$, and $U_{LB3}$ are also stored in register area 122.

Since variable q is 3, variable q is decremented by 1 in step S40, and steps S32 to S36 are repeated. More specifically, in the second cycle, upper and lower correlation weights $T_{U32}$ and $T_{L32}$ for 8-bit portions $a_{3ij}$ and $b_{2ij}$ are calculated. Since variables p and q are respectively 3 and 2, p=q. Therefore, no weight can be calcuated. Similarly, in the third cycle, upper and lower correlation weights $T_{U31}$ and $T_{L31}$ for 8-bit portions $a_{3ij}$ and $b_{1ij}$ are calculated. Calculated upper and lower correlation weights $T_{U32}$, $T_{L32}$, $T_{U31}$, and $T_{L31}$ are stored in register area 122.

After all the combinations of variable q for variable p=3 are completely calculated, N is determined in step S42, and step S44 is executed. In step S44, variable p is decremented by 1 to be 2. Variable q is set to be $n_2$, i.e., 3. Thereafter, the same processing as above is executed, so that upper and lower correlation weights $T_{U23}$, $T_{L23}$, $T_{U22}$, $T_{L22}$, $T_{U21}$, and $T_{L21}$ for 8-bit portions $a_{2ij}$ and $b_{3ij}$, 8-bit portions $a_{2ij}$ and $b_{2ij}$, and 8-bit portions $a_{2ij}$ and $b_{1ij}$ are calculated. Values $U_{UA2}$, $U_{UB2}$, $U_{LA2}$, and $U_{LB2}$ are calculated when p=q, i.e., p=2 and q=2. Variable is decremented in step S44. When p=1, upper and lower correlation weights $T_{U13}$, $T_{L13}$, $T_{U12}$, $T_{L12}$, $T_{U11}$, and $T_{L11}$ for 8-bit portions $a_{1ij}$ and $b_{3ij}$, 8-bit portions $a_{1ij}$ and $b_{2ij}$, and 8-bit portions $a_{1ij}$ and $b_{1ij}$ are calculated. In addition, values $U_{UA1}$, $U_{UB1}$, $U_{LA1}$, and $U_{LB1}$ are calculated when p=1 and q=1.

Since variables p and q are 1, Y is determined in step S38 and S42, and step S46 is executed. Since the input command is the covariance operation command, N is determined in step S46, and Y is determined in step S50 for the same reason. Therefore, the flow advances to step S52. In step S52, arithmetic operation unit 141 calculates covariance $\sigma_{AB}$ from equation (21) in accordance with the total $\sigma$ arithmetic processing command.

When the variance operation command for image data A is input as the statistic operation command, image data A is used as image data B, and the same processing as for the covariance operation command is performed. In this case, since N is determined in step S32 and Y is determined in step S54, step S56 is executed. It is checked in step S56 if p≧q. If N in step S56, the flow advances to step S38. If Y in step S56, the 8-bit image data processing module is executed. In this case, the order of 8-bit portions $a_{pij}$ and $a_{qij}$ designated by variables p and q does not influence the operation result. Finally, N is determined in step S50, and step S54 is executed. Then, variance $\sigma_A^2$ is calculated from equation (22).

What is claimed is:

1. A method for executing a statistic operation between image data A and B at high speed, where the image data A is constituted by pixel group $\Sigma A_{ij}$ consisting of N pixels $A_{ij}$ where N is a positive integer more than 2; i and j respectively indicate a row position and a column position, and density data $A_{dij}$ of each pixel $A_{ij}$ is expressed by n(2m)-bit data where n and m are positive integers, and the image data B is constituted by pixel group $\Sigma B_{ij}$ consisting of N pixels $B_{ij}$, and density data $B_{dij}$ of each pixel $B_{ij}$ is expressed by n(2m)-bit data, comprising:

carrying out, in accordance with an input $\Sigma AB$ processing command generated by a control unit and input to a calculation unit, a 3m-bit histogram operation for obtaining histogram $h_U(2^{2m}k_U+k_B)$ representing a number of sets of pixels $A_{ij}$ and $B_{ij}$, in which a value of upper m-bit portion $a_{Uij}$ of designated 2m-bit portion $a_{ij}$ is $k_U$ and a value of designated 2m-bit portion $b_{ij}$ of the pixel $B_{ij}$ at a same position as the pixel $A_{ij}$ is $k_B$, from a designated 2m-bit portion $a_{ij}$ of the pixel group $\Sigma A_{ij}$ and a designated 2m-bit portion $b_{ij}$ of the pixel group $\Sigma B_{ij}$, and calculating an upper correlation weight $T_U$ from equation (1) using the histogram $h_U(2^{2m}k_U+k_B)$:

$$T_U = \sum_{k_U=0}^{2^m-1} \sum_{k_B=0}^{2^{2m}-1} h_U(2^{2m}k_U + k_B) \cdot k_U \cdot k_B \quad (1)$$

carrying out, in accordance with the input $\Sigma AB$ processing command, the 3m-bit histogram operation for obtaining histogram $h_L(2^{2m}k_L+k_B)$ representing the number of sets of pixels $A_{ij}$ and $B_{ij}$, in which a value of lower m-bit portion $a_{Lij}$ of the designated 2m-bit portion $a_{ij}$ is $k_L$ and the value of the designated 2m-bit portion $b_{ij}$ of pixel $B_{ij}$ at the same position as the pixel $A_{ij}$ is $k_B$, from the designated 2m-bit portion $a_{ij}$ of the pixel group $\Sigma A_{ij}$ and the designated 2m-bit portion $b_{ij}$ of the pixel group $\Sigma B_{ij}$, and calculating a lower correlation weight $T_L$ from equation (2) using the histogram $h_L(2^{2m}k_L+k_B)$:

$$T_L = \sum_{k_U=0}^{2^m-1} \sum_{k_B=0}^{2^{2m}-1} h_L(2^{2m}k_L + k_B) \cdot k_L \cdot k_B \quad (1)$$

and, calculating, in accordance with the input $\Sigma AB$ processing command input to said calculation unit and generated by said control unit, correlation weight $T_{ab}$ from the calculated upper and lower correlation weights $T_U$ and $T_L$ using equation (3):

$$T_{ab} = 2^m T_U + T_L \quad (3).$$

2. The method according to claim 1, wherein n is 1, and
the method further comprises:
generating the $\Sigma AB$ processing command from said control unit in accordance with a 2m-bit covariance operation command as an input statistic operation command to said control unit,
calculating averages $\mu_A$ and $\mu_B$ for a designated 2m-bit portion $a_{ij}$ of the pixel group $\Sigma A_{ij}$ and a designated 2m-bit portion $b_{ij}$ of their pixel group $\Sigma B_{ij}$ in accordance with the input 2m-bit covariance operation command, and calculating covariance $\sigma_{AB2m}$ for the designated 2m-bit portions $a_{ij}$ and $b_{ij}$ from the calculated correlation weight $T_{ab}$ and the calculated averages $\mu_A$ and $\mu_B$ using equation (4) in the input 2m-bit covariance operation command:

$$\sigma_{AB2m} = (1/N)T_{ab} - \mu_A \cdot \mu_B \qquad (4).$$

3. The method according to claim 2, wherein said calculating the averages $\mu_A$ and $\mu_B$ includes:

calculating, in accordance with the input 2m-bit covariance operation command, an upper A weight $U_{UA}$ for the pixel group $\Sigma A_{ij}$ from equation (5) and an upper B weight $U_{UB}$ for the pixel group $\Sigma B_{ij}$ from equation (6) using the histogram $h_U(2^{2m}k_U+k_B)$ obtained by calculating the upper correlation weight $T_U$:

$$U_{UA} = \sum_{k_U=0}^{2^m-1} \sum_{k_B=0}^{2^{2m}-1} h_U(2^{2m}k_U + k_B) \cdot k_U \qquad (5)$$

$$U_{UB} = \sum_{k_B=0}^{2^{2m}-1} \sum_{k_U=0}^{2^m-1} h_U(2^{2m}k_U + k_B) \cdot k_B \qquad (6)$$

calculating, in accordance with the input 2m-bit covariance operation command, lower A weight $U_{LA}$ for the pixel group $\Sigma A_{ij}$ from equation (7) and lower B weight $U_{LB}$ for the pixel group $\Sigma B_{ij}$ from equation (8) using the histogram $h_L(2^m k_L + k_B)$ obtained by calculating the lower correlation weight $T_L$:

$$U_{LA} = \sum_{k_L=0}^{2^m-1} \sum_{k_B=0}^{2^{2m}-1} h_L(2^{2m}k_L + k_B) \cdot k_L \qquad (7)$$

$$U_{LB} = \sum_{k_B=0}^{2^{2m}-1} \sum_{k_L=0}^{2^m-1} h_L(2^{2m}k_L + k_B) \cdot k_B \qquad (8)$$

and determining, in accordance with the input 2m-bit covariance operation command, the averages $\mu_A$ and $\mu_B$ from the upper A weight $U_{UA}$, the upper B weight $U_{UB}$, the lower A weight $U_{LA}$, and the lower B weight $U_{LB}$ using equations (9) and (10):

$$\mu_A = (1/N)(2^m U_{UA} + U_{LA}) \qquad (9)$$

$$\mu_B = (1/N)(U_{UB} + U_{LB}) \qquad (10).$$

4. The method according to claim 2, further comprising:

executing a 3m histogram operation for obtaining histogram $h_A(k_A)$ while setting m-bit portion to be "0" and using the pixel group $\Sigma A_{ij}$ as pixel group $\Sigma B_{ij}$, and calculating average $\mu_A$ from the histogram $h_A(k_A)$ using equation (11), in accordance with a 2m-bit average operation command for the pixel group $\Sigma A_{ij}$ which operates as an input statistic operation command to said control unit:

$$\mu_A = (1/N) \sum_{K_A=0}^{2^{2m}-1} h_A(K_A) - K_A \qquad (11)$$

5. The method according to claim 2, further comprising:

using the pixel group $\Sigma A_{ij}$ as the pixel group $\Sigma B_{ij}$ in accordance with a 2m-bit variance operation command for pixel group $\Sigma A_{ij}$ which operates as an input statistic operation command to said control unit, and determining the covariance $\sigma_{AB2m}$ obtained for the designated 2m-bit portions $a_{ij}$ and $b_{ij}$ in the 2m-bit covariance operation command, to be variance $\sigma_A 2$.

6. The method according to claim 1, wherein n is an integer equal to or larger than 2, and the method further comprises:

generating, in accordance with an input total $\Sigma AB$ processing command generated by said control unit to said calculation unit, the $\Sigma AB$ processing command for all the combinations of designated 2m-bit portions $a_{pij}$ (p=1 to n) and $b_{qij}$ (q=1 to n) using the designated 2m-bit portion $a_{pij}$ as the designated 2m-bit portion $a_{ij}$ and the designated 2m-bit portion $b_{qij}$ as the designated 2m-bit portion $b_{ij}$, in association with combinations of the designated 2m-bit portions $a_{pij}$ and $b_{qij}$ arbitrarily designated from n 2m-bit portions $a_{pij}$ (p=1 to n) associated with pixel group $\Sigma A_{ij}$ and n 2m-bit portions $b_{qij}$ (q=1 to n) associated with pixel group $\Sigma B_{ij}$, and calculating $$\sum_{ij} A_{dij} \cdot B_{dij}$$

from equation (12) using the correlation weight $T_{ab}$ obtained for each of all the combinations of the designated 2m-bit portions $a_{pij}$ and $b_{qij}$ as pq correlation weight $T_{pq}$ in accordance with the total $\Sigma AB$ processing command:

$$\sum_{ij} A_{dij} \cdot B_{dij} = \sum_{p=1}^{n} \sum_{q=1}^{n} 2^{2m(p-1)} \cdot 2^{2m(q-1)} T_{pq} \qquad (12)$$

7. The method according to claim 6, further comprising:

generating the total $\Sigma AB$ processing command by said control unit in accordance with an input n(2m)-bit covariance operation command which operates as the input statistic operation command to said control unit, determining averages $\mu_{AT}$ and $\mu_{BT}$ for the pixel groups $\Sigma A_{ij}$ and $\Sigma B_{ij}$ in accordance with the n(2m)-bit covariance operation command, and calculating, in accordance with the n(2m)-bit covariance operation command, covariance $\sigma_{ABT}$ using equation (13) from the $\Sigma A_{dij} \cdot B_{dij}$ and the averages $\mu_{AT}$ and $\mu_{BT}$:

$$\sigma_{ABT} = (1/N) \sum_{ij} A_{dij} \cdot B_{dij} - \mu_{AT} \cdot \mu_{BT} \qquad (13)$$

8. The method according to claim 7, wherein said determining the averages $\mu_A$ and $\mu_B$ comprises:

calculating, in accordance with the input n(2m)-bit covariance operation command, upper A weight $U_{UAp}$ for the pixel group $\Sigma A_{ij}$ from equation (14) and upper B weight $U_{UBp}$ for the pixel group $\Sigma B_{ij}$ from equation (15) using histogram $h_{Up}(2^{2m}k_U+k_B)$ as the histogram $h_U(2^{2m}k_U+k_B)$ for a combination of p=q in the combinations of the designated 2m-bit portions $a_{pij}$ and $b_{qij}$:

$$U_{UAP} = \sum_{k_U=0}^{2^m-1} \sum_{k_B=0}^{2^{2m}-1} h_{Up}(2^{2m}k_U + k_B) \cdot k_U \quad (14)$$

$$U_{UBP} = \sum_{k_B=0}^{2^{2m}-1} \sum_{k_U=0}^{2^m-1} h_{Up}(2^{2m}k_U + k_B) \cdot k_B \quad (15)$$

calculating, in accordance with the input n(2m)-bit covariance operation command, lower A weight $U_{LAp}$ for the pixel group $\Sigma A_{ij}$ from equation (16) and lower B weight $U_{LBp}$ for the pixel group $\Sigma B_{ij}$ from equation (17) using the histogram $h_{Lp}(2^{2m}k_U+k_B)$ as the histogram $h_L(2^{2m}K_L+k_B)$ for a combination of p=q in the combinations of the designated 2m-bit portions $a_{pij}$ and $b_{qij}$; and $$U_{LAP} = \sum_{k_L=0}^{2^m-1} \sum_{k_B=0}^{2^{2m}-1} h_{Lp}(2^{2m}k_L + k_B) \cdot k_L \quad (16)$$

$$U_{LBP} = \sum_{k_B=0}^{2^{2m}-1} \sum_{k_L=0}^{2^m-1} h_{Lp}(2^{2m}k_L + k_B) \cdot k_B \quad (17)$$

and
calculating, in accordance with the input n(2m)-bit covariance operation command, the averages $\mu_{AT}$ and $\mu_{BT}$ using equations (18) and (19) from the upper A weight $U_{UAp}$ and the upper B weight $U_{UBp}$ and the lower A weight $U_{LAp}$ and the lower B weight $U_{LBp}$ from equations (18) and (19):

$$\mu_{AT} = \frac{1}{N} \sum_{p=1}^{n} 2^{2m(p-1)} (2^m U_{UAp} + U_{LAp}) \quad (18)$$

$$\mu_{BT} = \frac{1}{N} \sum_{p=1}^{n} 2^{2m(p-1)} (U_{UBp} + U_{LBp}) \quad (19)$$

9. The method according to claim 7, further comprising:
generating the n(2m)-bit covariance operation command by said control unit using the pixel group $\Sigma A_{ij}$ as the pixel group $\Sigma B_{ij}$ in accordance with an n(2m)-bit variance operation command for the pixel group $\Sigma A_{ij}$ which operates as the input statistic operation command to said control unit,
generating the $\Sigma AB$ processing command for combinations of the designated 2m-bit portions $a_{pij}$ and $b_{qij}$ which can satisfy p≦q, and
determining the covariance $\sigma_{AB}$ as variance $\sigma_A 2$.

10. The method according to claim 7, further comprising:
generating the 2m-bit average processing command by said control unit for all the designated 2m-bit portions $a_{pij}$ in accordance with the n(2m)-bit average operation command for the pixel group $\Sigma A_{ij}$ which operates as the input statistic operation command to said control unit,
calculating average $m_{AT}$ from equation (20) using an average $m_{pA}$ as the average mA obtained for the designated 2m-bit portion $a_{pij}$ in accordance with the n(2m)-bit average operation command:

$$m_{AT} = \sum_{p=1}^{n} 2^{2m(p-1)} m_{PA} \quad (20)$$

11. An image data processing apparatus for executing a statistic operation between image data A and B at high speed, comprising:
a first image memory for storing the image data A, wherein the image data A is constituted by pixel group $SA_{ij}$ consisting of N pixels $A_{ij}$ (N is a positive integer; i and j respectively indicate a row position and a column position), and density data $A_{dij}$ of each pixel $A_{ij}$ is expressed by n(2m)-bit data (n and m are positive integers);
a second image memory for storing the image data B, wherein the image data B is constituted by pixel group $SB_{ij}$ consisting of N pixels $B_{ij}$ (N is a positive integer; i and j respectively indicate a row position and a column position), and density data $B_{dij}$ of each pixel $B_{ij}$ is expressed by (2m)-bit data (n and m are positive integers);
histogram operation means for carrying out, in accordance with a SAB processing command, generated by a control unit, input thereto, a 3m-bit histogram operation for obtaining $h_U(2^{2m}k+k_B)$ or $h_L(2^{2m}k+k_B)$ representing a number of sets of pixels $A_{ij}$ and $B_{ij}$, in which a value of upper or lower m-bit portion $a_{Uij}$ or $a_{Lij}$ of designated 2m-bit portion $a_{ij}$ is k (k=0 to $2^m-1$), and a value of a designated 2m-bit portion of pixel $B_{ij}$ at a same position as the pixel $A_{ij}$ is $k_B$ ($k_B=0$ to $2^{2m}-1$), from upper or lower m-bit portion $a_{Uij}$ or $a_{Lij}$ of a designated 2m-bit portion $a_{ij}$ of each density data $A_{dij}$ read out from said first image memory and a designated 2m-bit portion $b_{ij}$ of each density data $B_{dij}$ read out from the second image memory; and
calculation means for calculating, in accordance with the $\Sigma AB$ processing command, generated by said control unit, input thereto, upper correlation weight $T_U$ from equation (1) using the histogram $h_U(2^{2m}k+k_B)$, and lower correlation weight $T_L$, from equation (2) using the histogram $h_L(2^{2m}k+k_B)$ and for calculating, in accordance with the $\Sigma AB$ processing command, correlation weight $T_{ab}$ using equation (3) from the upper and lower correlation weight $T_U$ and $T_L$:

$$T_U = \sum_{k=0}^{2^m-1} \sum_{k_B=0}^{2^{2m}-1} h_U(2^{2m}k + [kB] \, k_B) \cdot k \cdot k_B \quad (1)$$

$$T_L = \sum_{k=0}^{2^m-1} \sum_{k_B=0}^{2^{2m}-1} h_L(2^{2m}k + [kB] \, k_B) \cdot k \cdot k_B \quad (2)$$

$$T_{ab} = 2^{2m}T_U + T_L \quad (3)$$

said control unit provided for controlling said histogram operation means and said calculation means.

12. The apparatus according to claim 11, wherein said calculation means comprises:
$\Sigma$ operation means for calculating, in accordance with the $\Sigma AB$ processing command generated by said control unit, the upper correlation weight $T_U$ using equation (1) from the histogram $h_U(2^{2m}k+k_B)$ and the lower correlation weight $T_L$ using equation (2) from the histogram $h_L(2^{2m}k+k_B)$; and
arithmetic operation means for calculating a correlation weight $T_{ab}$ from the upper and lower correlation weights $T_U$ and $T_L$ using equation (3) in accordance with the $\Sigma AB$ processing command generated by said control unit, said control means includes means for sequentially controlling said histogram operation means and $\Sigma$ operation means to obtain the upper correlation weight $T_U$ and the lower correlation weight $T_L$, and thereafter, said arithmetic operation means to obtain the correlation weight $T_{ab}$.

13. The apparatus according to claim 12, wherein said histogram operation means comprises:

first histogram processing means for executing the 3m-bit histogram operation associated with the upper m-bit portion $a_{Uij}$ of the designated 2m-bit portion $a_{ij}$ and the designated 2m-bit portion $b_{ij}$ in accordance with the $\Sigma AB$ processing command; and second histogram processing means for executing the 3m-bit histogram operation associated with the lower m-bit portion $a_{Lij}$ of the designated 2m-bit portion aij and the designated 2m-bit portion $b_{ij}$ in accordance with the $\Sigma AB$ processing command, said $\Sigma$ operation means comprises:

first $\Sigma$ processing means for calculating, in accordance with the $\Sigma AB$ processing command, the upper correlation weight $T_U$ using equation (1) from the 3m-bit histogram obtained from said first histogram processing means; and second $\Sigma$ processing means for calculating, in accordance with the $\Sigma AB$ processing command, the lower correlation weight $T_L$ using equation (2) from the 3m-bit histogram obtained from said second histogram processing means, and said control means includes unit for simultaneously controlling said first and second histogram processing means and said first and second $\Sigma$ processing means to obtain the upper and lower correlation weight $T_U$ and $T_L$, and for subsequently controlling said arithmetic operation means to obtain the correlation weight $T_{ab}$.

14. The apparatus according to claim 12, wherein n is 1, and an input statistic operation command to said control unit is a 2m-bit covariance operation command which is input to said control unit, said control unit further comprises means for generating the $\Sigma AB$ processing command and a 2m-bit weight processing command, in accordance with the 2m-bit covariance operation command input thereto, said calculation means further comprises means for calculating upper A weight $U_{UA}$ and upper B weight $U_{UB}$ from equations (4) and (5) using the histogram $h_U(2^{2m}k+k_B)$ in accordance with the 2m-bit weight processing command when the upper correlation weight $T_U$ is calculated in accordance with the $\Sigma AB$ processing command, for calculating lower A weight $U_{LA}$ and lower B weight $U_{LB}$ from equations (6) and (7) using the histogram $h_L(2^{2m}k+k_B)$ in accordance with the 2m-bit weight processing command when the lower correlation weight $T_L$ is calculated in accordance with the $\Sigma AB$ processing command, and for calculating covariance $\Sigma AB$ using equation (8) from the correlation weight $T_{ab}$, the upper A weight $U_{UA}$, the upper B weight $U_{UB}$, the lower A weight $U_{LA}$, and the lower B weight $U_{LB}$ in accordance with the 2m-bit covariance operation command:

$$U_{UA} = \sum_{k=0}^{2^m-1} \sum_{k_B=0}^{2^{2m}-1} h_U(2^{2m}k + k_B) \cdot k \quad (4)$$

$$U_{UB} = \sum_{k_B=0}^{2^{2m}-1} \sum_{k=0}^{2^m-1} h_U(2^{2m}k + k_B) \cdot k_B \quad (5)$$

$$U_{LA} = \sum_{k=0}^{2^m-1} \sum_{k_B=0}^{2^{2m}-1} h_L(2^{2m}k + k_B) \cdot k \quad (6)$$

$$U_{LB} = \sum_{k=0}^{2^{2m}-1} \sum_{k=0}^{2^m-1} h_L(2^{2m}k + k_B) \cdot k_B \quad (7)$$

$$\sigma_{AB} = (1/N) T_{ab} - (1/N^2)(2^m U_{UA} + U_{LA})(U_{UB} + U_{LB}) \quad (8)$$

15. The apparatus according to claim 14, wherein said control unit further comprises means for generating a 2m-bit average processing command in accordance with an average operation command for the pixel group $\Sigma A_{ij}$ which operates as the input statistic operation command input to said control unit, said histogram operation means further comprises means for executing the 3m-bit histogram processing while setting the m-bit portion $a_{Uij}$ or $a_{Lij}$ as "0" and using pixel group $\Sigma A_{ij}$ designated by the average operation command as pixel group $\Sigma B_{ij}$ in accordance with the 2m-bit average processing command, said calculation means further comprises means for calculating average $\mu_A$ from the calculated 3m-bit histogram $h_A(k_A)$ ($k_A = 0$ to $2^{2m}-1$) using equation (9) in accordance with an input 2m weight processing command:

$$\mu_A = (1/N) \sum_{k_A=0}^{2^{2m}-1} h_A(k_A) \cdot k_A \quad (9)$$

16. The apparatus according to claim 15, wherein said control unit further comprises means for generating the $\Sigma AB$ processing command and the 2m-bit weight processing command in which pixel group $\Sigma A_{ij}$ is used as pixel group $\Sigma B_{ij}$, in accordance with a variance operation command for pixel group $\Sigma A_{ij}$ which operates as the input statistic operation command thereto, and for making the obtained covariance $\sigma_{AB}$ become variance $\sigma_A 2$.

17. The apparatus according to claim 11, wherein n is an interger of not less than 2, said control unit further comprises means for generating, in accordance with an input total $\Sigma AB$ processing command input to said control unit, the $\Sigma AB$ processing command for all the combinations of the designated 2m-bit portions $a_{pij}$ and $b_{qij}$ using the designated 2m-bit portion $a_{pij}$ as the 2m-bit portion $a_{ij}$ and designated 2m-bit portion $b_{qij}$ as the 2m-bit portion $b_{ij}$ in association with combinations of the designated 2m-bit portions $a_{pij}$ and $b_{qij}$ arbitrarily designated from n 2m-bit portions $a_{pij}$ (p=1 to n) associated with pixel group $\Sigma A_{ij}$ and n 2m-bit portions $b_{qij}$ (q=1 to n) associated with pixel group $\Sigma B_{ij}$, said arithmetic operation means further comprises means for calculating, in accordance with an input total addition processing command generated by said control unit to said arithmetic operation means, $\Sigma A_{dij} \cdot B_{dij}$ from equation (10) using correlation weight Tab obtained for each of the combinations of the designated 2m-bit portions $a_{pij}$ and $b_{qij}$ as pq correlation weight $T_{pq}$:

$$\Sigma A_{dij} \cdot B_{dij} = \sum_{p=1}^{n} \sum_{q=1}^{n} 2^{(p-1)(q-1)2m} T_{pq} \quad (10)$$

18. The apparatus according to claim 17, wherein said control unit further comprises:

means for generating the total $\Sigma AB$ processing command, a total 2m-bit weight processing command, and a total $\sigma$ arithmetic operation command in accordance with an input covariance operation command input to said control unit, and means for generating a 2m-bit weight processing command for the combinations of the designated 2m-bit portions $a_{pij}$ and $b_{qij}$ when p=q, in accordance with a total 2m-bit weight processing command input to said control unit, said arithmetic operation means further comprises means for determining upper A weight $U_{UA}$, upper B weight $U_{UB}$, lower A weight $U_{LA}$, and lower B weight $U_{LB}$ obtained for each of the combinations of the designated 2m-bit portions $a_{pij}$ and $b_{pij}$ in accordance with the W2m-bit weight processing command when p=q, to be upper A weight $U_{UAp}$, upper B weight $U_{UBp}$, lower A weight $U_{LAp}$, and lower B weight $U_{LBp}$ and for calculating, in accordance with the total $\sigma$ arithmetic operation command, covariance $\sigma_{AB}$ from equation (11):

$$\sigma_{AB} = (1/N) \Sigma A_{dij} B_{dij} - (1/N^2). \quad (11)$$

$$\sum_{p=1}^{n} 2^{(p-1)2m} (2^m U_{UAp} + U_{LAp}).$$

$$\sum_{q=1}^{n} 2^{2m(q-1)} (U_{UBp} + U_{LBp})$$

19. The apparatus according to claim 18, wherein said control unit further comprises means for generating the covariance operation command in which pixel group $\Sigma B_{dij}$ is used as pixel group $\Sigma A_{ij}$, in accordance with a variance operation command which operates as the input statistic operation command input to said control unit, and for making the obtained covariance $\sigma_{AB}$ become a variance $\sigma A^2$.

* * * * *